US010679086B2

(12) United States Patent
Zucker et al.

(10) Patent No.: US 10,679,086 B2
(45) Date of Patent: Jun. 9, 2020

(54) IMAGING DISCERNMENT OF INTERSECTING INDIVIDUALS

(71) Applicant: NCR Corporation, Duluth, GA (US)

(72) Inventors: Brent Vance Zucker, Roswell, GA (US); Yehoshua Zvi Licht, Alpharetta, GA (US)

(73) Assignee: NCR Corporation, Atlanta, GA (US)

( * ) Notice: Subject to any disclaimer, the term of this patent is extended or adjusted under 35 U.S.C. 154(b) by 229 days.

(21) Appl. No.: 15/692,902

(22) Filed: Aug. 31, 2017

(65) Prior Publication Data

US 2019/0065881 A1 Feb. 28, 2019

(51) Int. Cl.
*G06K 9/34* (2006.01)
*G06K 9/00* (2006.01)
*G06K 9/62* (2006.01)
*G06K 9/32* (2006.01)

(52) U.S. Cl.
CPC .......... *G06K 9/34* (2013.01); *G06K 9/00295* (2013.01); *G06K 9/00778* (2013.01); *G06K 9/6232* (2013.01); *G06K 2009/3291* (2013.01)

(58) Field of Classification Search
USPC .................................. 382/103, 190; 348/169
See application file for complete search history.

(56) References Cited

U.S. PATENT DOCUMENTS

| | | | | |
|---|---|---|---|---|
| 2009/0059007 | A1* | 3/2009 | Wagg ................. | G06K 9/00369 348/157 |
| 2012/0169887 | A1* | 7/2012 | Zhu ..................... | G06K 9/00335 348/207.1 |
| 2016/0019700 | A1* | 1/2016 | Maggio .................... | G06T 7/20 382/103 |

FOREIGN PATENT DOCUMENTS

GB 2452512 * 11/2009 ............... G06T 7/20

* cited by examiner

*Primary Examiner* — Ishrat I Sherali
(74) *Attorney, Agent, or Firm* — Schwegman, Lundberg & Woessner

(57) ABSTRACT

Image features for individuals are tracked and refined for a tracking system. An image is identified where two than more individuals are intersecting one another, such that features of one of the individuals are unavailable. The known features for the individuals and the unknown features present in the image are processed to identify the obscured individual in the image.

18 Claims, 4 Drawing Sheets

IMAGING DISCERNMENT OF INTERSECTING INDIVIDUALS

BACKGROUND

A variety of mobile-based services exist in the industry for users and businesses to: obtain information, perform transactions, watch entertainment, and socialize with business associates, friends, and family members.

Enterprises have been leveraging the environment to provide a variety of automated services to customers. One recent development, is a frictionless store in which a customer can enter a store and shop without ever accessing any electronic device and without interacting with a clerk to checkout of the store with purchased items. This computer vision based technology is on the rise for other reasons as well, such as inventor management and theft prevention.

One problem with the frictionless store is when two or more individuals cross paths with one another or are in the same field of view of the video cameras, such that the two individuals appear to intersect within the store at a same physical location.

In fact, in some situations an image of one individual may block the image of another individual. Again, this can happen when the two individuals are in close proximity to one another or when there is a substantial distance between the two individuals with one individual being closer to the camera so as the two images from the camera appears to depict the individuals in close physical proximity to one another. The issue is further exacerbated when the two individuals are both actually in close physical proximity to one another and both are also in close proximity to the camera, in such a circumstance the two individuals appear as a single individual to the camera and the farthest individual appears to be missing from the field of view of the camera.

The problems with discerning intersecting individuals within a frictionless store becomes conflated when more than two individuals appear to intersect in the field of view of a camera and when the frictionless store is experiencing heavy customer traffic.

SUMMARY

In various embodiments, methods and a system for imaging discernment of intersecting individuals are presented.

According to an embodiment, a method for imaging discernment of intersecting individuals is presented. More particularly, image features are e extracted from frames for unique identifying a first real-world object and a second real-world object. A particular frame in which the first real-world object at least partially obscures the second real-world object is identified. The second real-world object is tracked in the particular frame and subsequent frames while the second-real world object remains at least partially obscured by the first real-world object.

DETAILED DESCRIPTION

Figure 1:
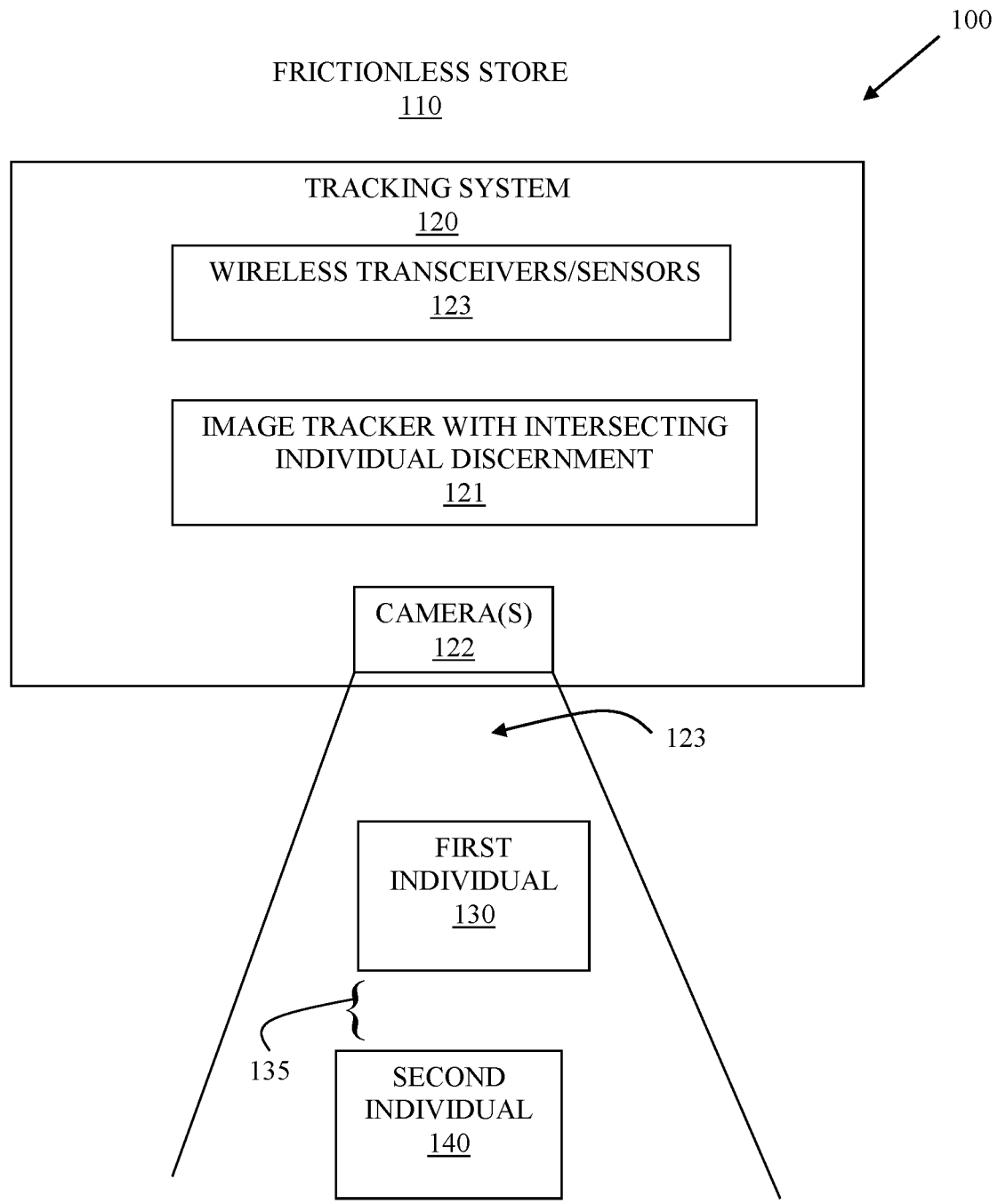
FIG. 1 is a diagram of a system for imaging discernment of intersecting individuals, according to an example embodiment.

FIG. 1 is a diagram of a system 100 for imaging discernment of intersecting individuals, according to an example embodiment. The various components are illustrated and the arrangement of the components is presented for purposes of illustration only. It is to be noted that other arrangements with more or less components are possible without departing from the imaging discernment of intersecting individuals' teachings presented herein and below.

The techniques, methods, and system presented herein and below for imaging discernment of intersecting individuals can be implemented in whole or in part in one, all, or some combination of the components shown with the system 100. The techniques and methods are programmed as executable instructions in memory and/or non-transitory computer-readable storage media and processed on one or more processors associated with the various components.

As used herein the terms "customer," "consumer," "individual," and "user" may be used synonymously and interchangeably.

As used herein the term "intersecting" is intended to mean the condition that results in an image when a camera obtains the image from its field of view (FOV) and the resulting image appears to depict a single individual when two or more individuals are actually present when the image was captured. This can occur when the individuals are actually in close physical proximity to one another or when the individuals are not necessarily in close physical proximity when the camera takes an image and the image appears to depict the individuals in close physical proximity. This can also occur when the image appears to be missing any depiction of at least one of the two individuals that are physically present when the image was captured by the camera (one or more individuals are blocked in the image captured).

The system 100 is deployed in a frictionless store 110. Although it is to be noted that in some embodiments, the system 100 is deployed (in other embodiments) for a variety of other purposes, such as but not limited to, security, inventory management, and other purposes.

The system 100 includes: A tracking system 120. The tracking system 120 includes a variety of wireless transceivers/sensors 123 (Bluetooth®, Near Filed Communication (NFC), Wi-Fi, Radio Frequency (RF), cellular, satellite, weight sensor, temperature/humidity sensor, Infrared (IR), optical sensor, optical sensor, motion sensor, biometric sensor, liquid sensor, gas sensor, metallic sensor, etc.). The system 120 also includes a variety of cameras 122 (video capable, IR capable, still image camera, motion-sensing and activing camera, etc.).

Furthermore, the system 120 includes computer vision-based processing that is enhanced with the image tracker with intersecting individual discernment 121 (just "tracker 121" hereinafter), discussed herein and below.

As described above, existing deployments of computer-vision and people tracking systems struggle when two or more individual appear in the FOV of the cameras, this issue is mitigated or abrogated entirely with the processing described herein for the system 100.

The tracker 121 employs a supervised machine-learning algorithm that classifies customers based on features extracted from the images captured by the cameras 122. The tracker 121 is continuously training (enhancing) itself each time a new frame (image from a video stream of the cameras 122) is taken by the cameras 122.

In an embodiment, the machine learning processed by the tracker 121 is a K-Nearest Neighbor (k-NN) algorithm customized for the teachings presented herein.

The features extracted from the images can be any pixel based feature discernible for the images, such as but not limited to color, brightness, intensity, height, width, a centroid pixel within a bounding box, etc.

During operation, the tracker 121 assigns a bounding box to what is believed to be an individual in the images. The features in the images for a centroid of each bounding box (multiple boxes for multiple customer images) is tracked. The height and width of the bounding box is also tracked. For example, the width can increase when a frame shows a tracked bounding box extending an arm in an aisle of the store 110. The width of a bounding box can also contract from frame to frame (customer with arms at his/her side (arms not extended)). The centroid can also be used to ascertain where the most mass of a given individual is situated, such as waist or torso but can change depending on what was actually captured as features from frame to frame.

The tracker 121 also has information to ascertain the location within the store 110 of any individual based on the customer's tracked bounding box and the known location and FOV 23 for the camera 122 presenting capturing frames of the customer.

Furthermore, these unique identifying image features of each customer is initially obtained when the customer is captured in a frame from a camera situated at an entryway of the store 110 and labeled for tracking that customer within the store 110. It is to be also noted that in some instances this initial image feature labeling can occur on the premises of the store 110, such as through cameras 122 situated on roofs and parking light poles in the parking lot of the store 110.

The initial feature setting for any customer can include, by way of example only, customer size (can change based on the FOV 123 of the capturing camera 122), customer width (again can change depending on the FOV 123 or actions of the customer (kneeling, reaching, sitting, standing normally, etc.). color of apparel being worn by the customer (can change based on location, lighting where frames are captured), hair color (may still have variations due to lighting where frames are captures), customer center of mass (remains largely stable), etc.

The tracker 121 tracks the customers through their bounding boxes from frame to frame and from the specific cameras 122 with their known locations and FOVs 123 within the store 110.

As customers move about the store 110 and are being tracked, the tracker 121 is receiving real-time image frames for images of each independently tracked customer. The values of these features are also dynamically changing (as discussed above), and the tracker 121 is continually training itself with the newest and updated features for each of the customers.

At some location within the store 110, a first individual (first customer) 130 is identified in a frame of an image from a camera 122 within that camera's FOV 123. A second individual (second customer) 140 is also captured within that image. This image includes two intersecting customers 130 and 140 because a portion of the image does not permit the tracker 121 to clearly identify (discern) the second customer 140. The actual physical distance 135 between the two customers 130 and 140 can vary (can be 1 foot or can be 10 feet), the intersection may also nearly obstruct all portions of the second customer's tracked bounding box.

However, prior to the point of intersection, the tracker is continually extracting and refining what the unique image features are for each customer 130 and 140. The tracker 121 also knows where within the store a last bounding box for customer 2 140 was obtained and knows the location of where the present camera 122 is taking the intersecting frame and has access to the present time of day, such that the tracker 121 has a strong degree of confidence that customer 2 140 is supposed to be present in the image with the first customer 130. In fact, the tracker 121 may even be able to ascertain the direction that customer 2 140 was moving as an attribute of the last taken image for the customer 140. This permits the tracker to at least identify that the second customer 140 should be present in the image with the first customer 130. This condition can be flagged by the tracker as an indication that two customers 130 and 140 are intersecting any given frame taken from any given camera 122.

This allows the tracker 121 to continually collect known features of the customers 130 and 140 as well as identify their locations within the store 110 and, perhaps, their lost direction of travel within the store 110 and identify when the two customers 130 and 140 are in fact intersecting within a particular image (frame). The tracker 121 is also able to at least clearly identify the bounding box from the image for the first customer 130. The remaining features present in the image are either background (pixel details of the store 110 and/or items within the store 110) or pixel data depicting the blocked or partially blocked second customer 140. Since, the tracker 121 is continually evaluating features of the first customer 130 and second customer 140, the tracker can identify (when there is not a complete blocking of the second customer 140 in the image) some features known to exist or that may now exist for the second customer 140 (by subtraction of the first customer's features and the background features from unknown features present in the image).

By properly classifying features of the first customer 130 and potential or definitive features of the second customer 140 in the image, the tracker 121 can associate any item picked up by one of the customer's from the store 110 with the appropriate customer that is responsible for paying for such item. For example, suppose the second customer 140 extends his/her arm and takes a specific bottle of shampoo off the shelf, the tracker 121 can identify from the image that there is an intersection and that the unknown features (pixel data) for the arm belongs to the second customer 140 and not the first customer 130 (the arm is near the length associated with the second customer 140, the arm is shorter than that of the first customer 130, a shirt color matches features known for the second customer 140, the shirt color does not match the first customer 130, etc.).

Again, features for each of the customers 130 and 140 present in the frames are continually and regularly being captured and evaluated by the tracker 121, such that the tracker 121 is able to improve its degree of confidence in properly identifying each of the customers 130 and 140 within a given frame where the two customers 130 and 140 are intersecting. Known features for each customer 130 and 140 and unknown features present in the image are evaluated with some of the unknown features being more closely attributable to the second customer 140 based on the then-existing known features for the second customer 140.

A sample pseudo code for the tracker 121 may appear as follows:

```
//Assume img-frame is a processed image in the form of a
RGB (Red-Green-Blue) or HSV (Hue-Saturation Value) matrix
//Assume IsPeolpleIntersecting is a function that detects
people in an image and determines if the people are
intersection (such as any of the techniques discussed above)
def ClassifyShopers(img_frame);
If isPeopleIntersecting (img-frame) == False
// collect data: color histogram of person, location, size,
personID
    x, y - extract_features(img-frame);
    data.append((x, y));
else
    x = extract-features(img_frame);
    y = classify(x);
    data.append((x, y));
return data;
```

Again, the tracking system 100 can be deployed for a variety of purposes for classifying individuals that are intersecting, such as the frictionless store 110, a security system, an inventory system, etc.

Additionally, it is to be noted that although the discussion above was with respect to two customers, the intersection processing for properly classifying intersecting customers can occur with more than two intersecting customers within a single frame (image).

These and other embodiments are now discussed with reference to the FIGS. 2-4.

Figure 2:
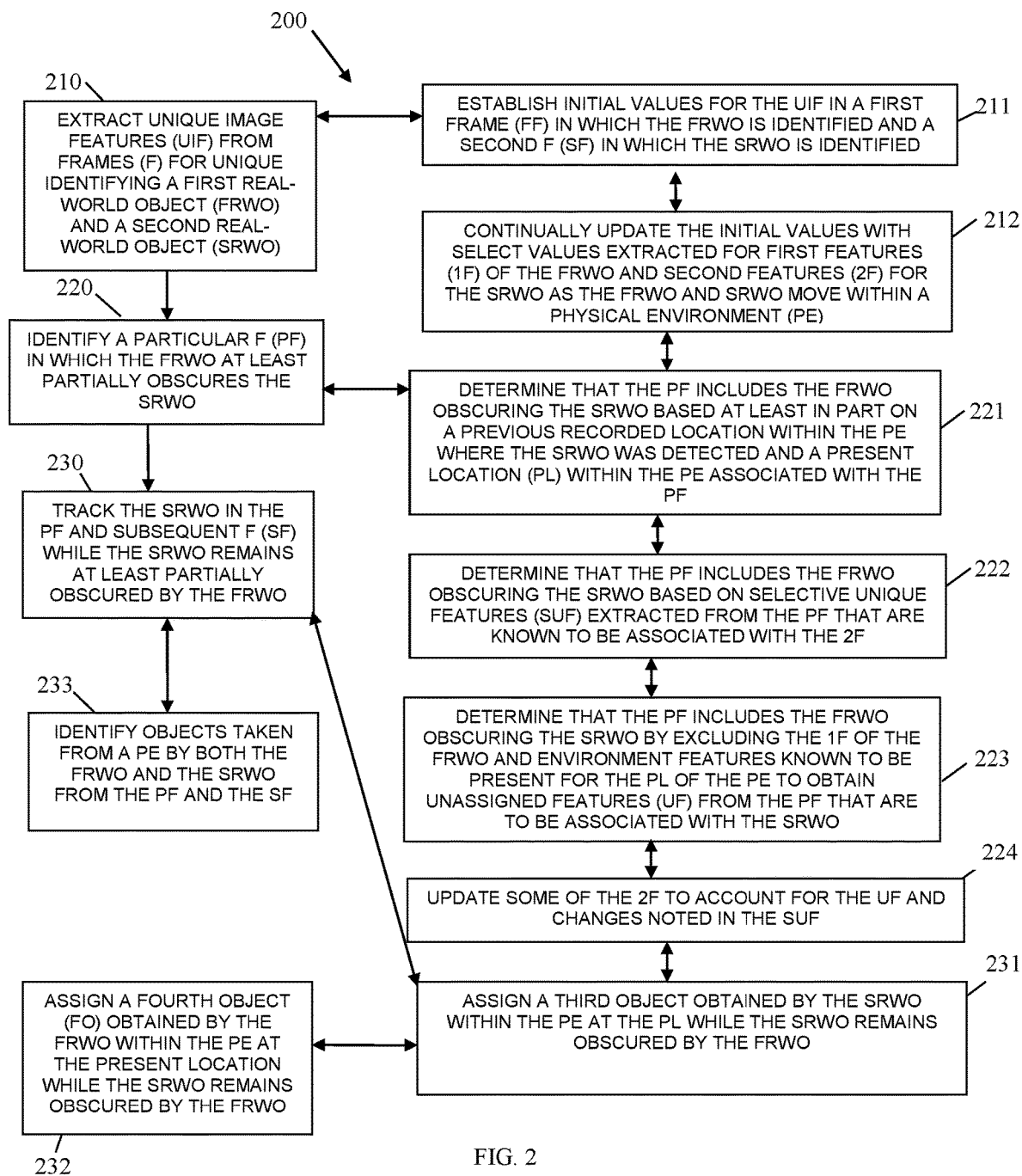
FIG. 2 is a diagram of a method for imaging discernment of intersecting individuals, according to an example embodiment.

FIG. 2 is a diagram of a method 200 for imaging discernment of intersecting individuals, according to an example embodiment. The software module(s) that implements the method 200 is referred to as an "intersection classification manager." The intersection classification manager is implemented as executable instructions programmed and residing within memory and/or a non-transitory computer-readable (processor-readable) storage medium and executed by one or more processors of a device. The processor(s) of the device that executes the intersection classification manager are specifically configured and programmed to process the intersection classification manager. The intersection classification manager has access to one or more networks during its processing. The networks can be wired, wireless, or a combination of wired and wireless.

In an embodiment, the intersection classification manager is the tracker 121.

In an embodiment, the device that executes the intersection classification manager is a server.

In an embodiment, the device that executes the intersection classification manager is a plurality of servers logically organized as a cloud processing environment.

At 210, the intersection classification manager extract unique image features from frames for uniquely identifying a first-real-world object (first object) and a second real-world object (second object). In an embodiment, the first object and the second object are people. In an embodiment, the first object and the second object are animals. In an embodiment, the first object and the second object are vehicles. In an embodiment, the first object and the second object are drones or robots. In an embodiment, the first object is a different type of real-world object from the second object.

According to an embodiment, at 211, the intersection classification manager establishes initial values for the unique image features in a first frame in which the first object is identified and a second frame in which the second object is identified. In an embodiment, the first and second frame are recorded an entryway (ingress) point to a physical environment that deploys a tracking system having the intersection classification manager.

In an embodiment of 211 and at 212, the intersection classification manager continually updates initial values with select values extracted for first features of the first object and second features for the second object as the first object and the second object within a physical environment.

At 220, the intersection classification manager identifies a particular frame in which the first object at least partially obscures the second object. That is the two objects are intersecting within the particular frame as defined above with the discussion of the system 100.

In an embodiment of 212 and 220, at 221, the intersection classification manager determines that the particular frame includes the first object obscuring the second object based at least in part on a previous recorded location within the physical environment where the second object was detected and a present location within the physical environment associated with the particular features. This can also be based on a previous recorded location for the first object that is not obscured.

In an embodiment of 221 and at 222, the intersection classification manager determines that the particular frame includes the first object obscuring the second object based on selective unique features extracted from the particular frame that are known to be associated with the second features for the second object.

In an embodiment of 222 and at 223, the intersection classification manager determines that the particular frame includes the first object obscuring the second object by excluding the first features of the first object and environment features known to be present for the physical environment to obtained unassigned features from the particular frame that are to be potentially associated with the second object (obscured object).

In an embodiment of 223 and at 224, the intersection classification manager updates some of the second features to account for the unique features and changes that are dynamically noted for the selectively unique features.

At 230, the intersection classification manager tracks the second object in the particular frame and subsequent recorded frames while the second object remains at least partially obscured by the first object.

In an embodiment of 224 and 230, at 231, the intersection classification manager assigns a third object obtained by the second object within the physical environment while the second object remains obscured by the first object.

In an embodiment of 231 and at 232, the intersection classification manager assigns a fourth object obtained by the first object within the physical environment at the present location while the second object remains obscured by the first object.

In an embodiment, at 233, the intersection classification manager identifies objects taken from a physical environment by both the first object and the second object from the particular frame and the subsequent frames.

Figure 3:
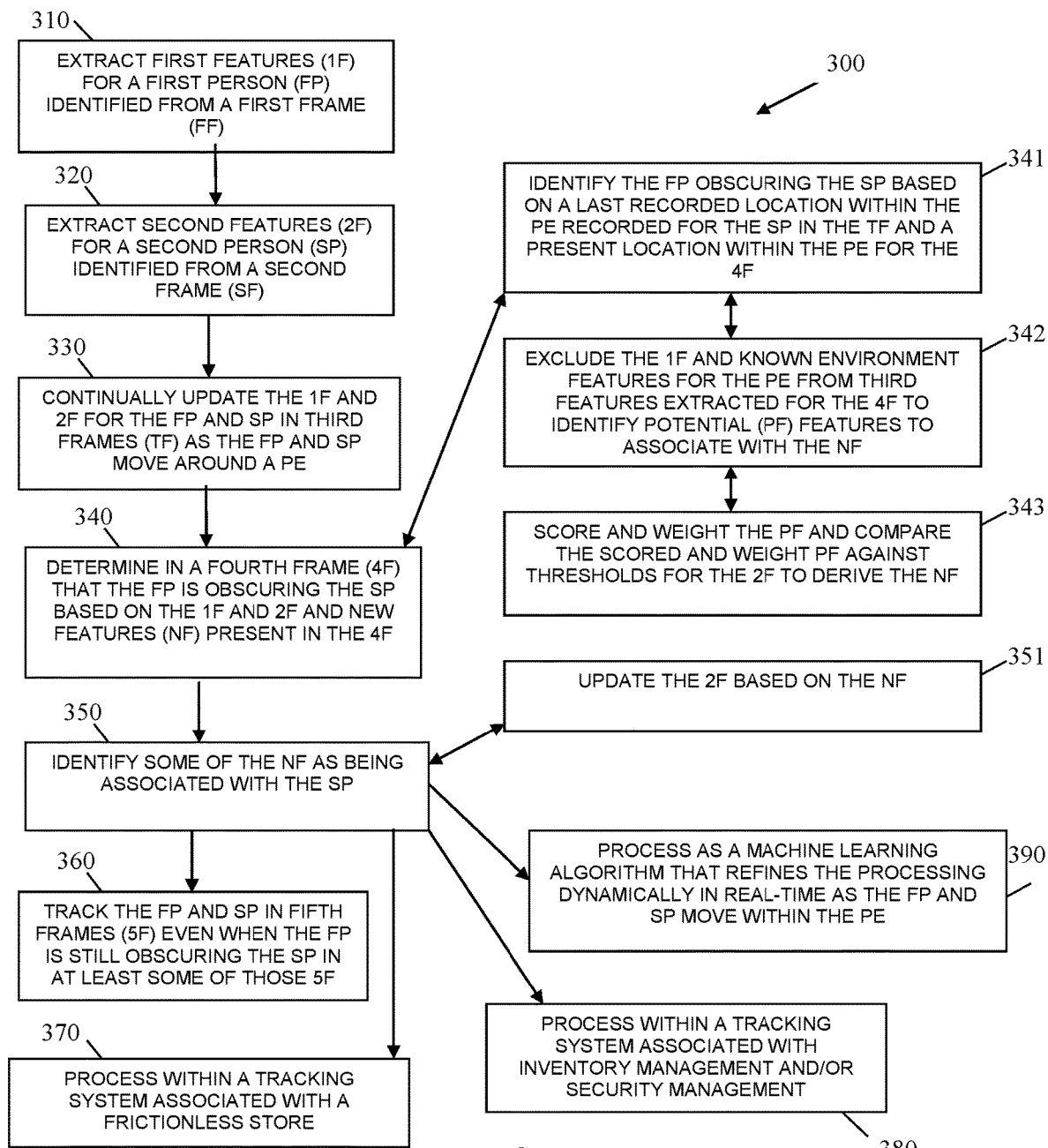
FIG. 3 is a diagram of another method for imaging discernment of intersecting individuals, according to an example embodiment.

FIG. 3 is a diagram of another method 300 for imaging discernment of intersecting individuals, according to an example embodiment. The software module(s) that implement the method 300 is referred to herein as an "identification manager." The identification manager is implemented as executable instructions and programmed within memory and/or a non-transitory computer-readable (processor-readable) storage medium that executes on one or more processors of a device. The processors of the device are specifically configured to execute the identification manager. The identification manager has access one or more networks; the networks can be wired, wireless, or a combination of wired and wireless.

In an embodiment, the identification manager is all or some combination of 121 and the method 200.

In an embodiment, the device that executes the identification manager is a server.

In an embodiment, the device that executes the identification manager is a plurality of servers cooperating as a cloud processing environment.

In an embodiment, the identification manager presents another and in some ways enhanced perspective of the intersection classification manager for the method 200 of the FIG. 2.

At 310, the identification manager extracts first features for a first person from a first frame.

At 320, the identification manager extracts second features for a second person from a second frame.

In an embodiment, the first and second frames are captured at different times.

At 330, the identification manager continually updates the first features and the second features for the first person and the second person in third frames as the first person and second person move around/about a physical environment.

At 340, the identification manager determines a fourth frame for which the first person is obscuring the second person based on the continually updated first frames and second frames. The first and second persons are intersecting one another in the fourth frame as discussed above with the system 100.

According to an embodiment, at 341, the identification manager identifies the first person obscuring the second person based on a last recorded location within the physical environment recorded for the second person in the third frame and a present location recorded in the fourth frame where the first person is not obscured (unobscured).

In an embodiment of 341 at 342, the identification manager excludes the first features (uniquely linked to the first person) and known environment features for the physical environment (background images) from third features extracted for the fourth frame to identify potential features to associate with the new features.

In an embodiment of 342 and at 343, the identification manager scores and weights the potential features and compares the scored and weighted potential features against thresholds for the second features to derive the new features. That is, there is a fuzzy comparison between the potential features and the second features to derive the new features.

At 350, the identification manager identifies some of the new features as being associated uniquely with the second person in the fourth frame.

In an embodiment, at 351, the identification manager updates or augments the second features for the second person with the new features obtained for the second person obscured in the fourth frame.

At 360, the identification manager tracks the first person and the second person in fifth frames even when the first person is still obscuring the second person in at least some of those fifth frames.

According to an embodiment, at 370, the identification manager is processed within a tracking system associated with a frictionless store.

In an embodiment, at 380, the identification manager is processed within a tracking system associated with inventory management and/or security management.

In an embodiment, at 390, the identification manager processes a machine learning algorithm that refines the processing dynamically and in real time as the first person and the second person move within the physical environment with continually updating and changing first, second, and/or new features.

Figure 4:
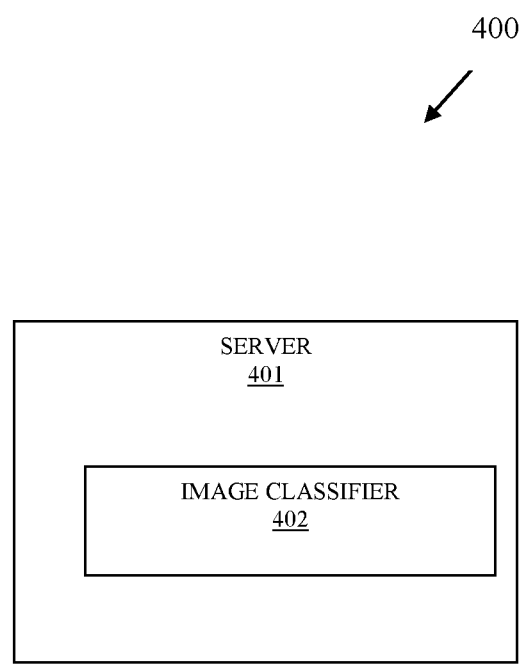
FIG. 4 is a diagram of another system for imaging discernment of intersecting individuals, according to an example embodiment.

FIG. 4 is a diagram of another system 400 for imaging discernment of intersecting individuals, according to an example embodiment. The components of the system 400 are programmed and reside within memory and/or a non-transitory computer-readable medium and execute on one or more processors of the devices of the system 400. The system 400 also has access and can communicate over one or more networks; and the networks can be wired, wireless, or a combination of wired and wireless.

The system 400 is configured and programmed to perform the processing discussed above with the FIGS. 1-3.

The system 400 includes a server 401 having an image classifier 402.

In an embodiment, the server 401 is a server.

In an embodiment, the server 401 is a part of a cloud processing environment.

In an embodiment, the image classifier 402 is all of or some combination of: 121, the method 200, and/or the method 300.

The image classifier 402 executes on the server 401 and is configured to: i) execute on at least one processor of the server 401, ii) maintain unique image features that are continually refined for uniquely identifying a first person and a second person from image frames, iii) identify select frames in which the first person is at least partially obscuring the second person, iv) assign new tracking features identified from the select frames to the second person, and v) track actions taken by the first person and the second person within a physical environment in all of the frames.

In an embodiment, the system 400 is deployed, implemented, or employed within: a frictionless store (such as frictionless store 110), a secure area being monitored, and/or an area where inventory is being monitored and managed.

It should be appreciated that where software is described in a particular form (such as a component or module) this is merely to aid understanding and is not intended to limit how software that implements those functions may be architected or structured. For example, modules may be illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors of a single device, or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
extracting unique image features from frames for unique identifying a first real-world object and a second real-world object, extracting further includes establishing initial values for the unique image features in a first frame in which the first real-world object is identified and a second frame in which the second real-word object is identified, establishing further includes continually updating the initial values with select values extracted for first features of the first real-world object and second features for the second real-world object as the first and second real-world object move within a physical environment;
identifying a particular frame in which the first real-world object at least partially obscures the second real-world object; and
tracking the second real-world object in the particular frame and subsequent frames while the second-real world object remains at least partially obscured by the first real-world object.

2. The method of claim 1, wherein identifying further includes determining that the particular frame includes the first real-world object obscuring the second real-world object based at least in part on a previous recorded location within the physical environment where the second-real world object was detected and a present location within the physical environment associated with the particular frame.

3. The method of claim 2, wherein determining further includes determining that the particular frame includes the first real-world object obscuring the second real-world object based on selective unique features extracted from the particular frame that are known to be associated with the second features.

4. The method of claim 3, wherein determining further includes determining that the particular frame includes the first real-world object obscuring the second real-world object by excluding the first features of the first real-world object and environment features known to be present for the present location of the physical environment to obtain unassigned features from the particular frame that are to be associated with the second real-world object.

5. The method of claim 4, wherein determining further includes updating some of the second features to account for the unassigned features and changes noted in the selective unique features.

6. The method of claim 5, wherein tracking further includes assigning a third object obtained by the second real-world object within the physical environment at the present location while the second real-world object remains obscured by the first real-world object.

7. The method of claim 6, wherein assigning further includes assigning a fourth object obtained by the first real-world object within the physical environment at the present location while the second real-world object remains obscured by the first real-world object.

8. The method of claim 1, wherein tracking further includes identifying objects taken from a physical environment by both the first real-world object and the second real-world object from the particular frame and the subsequent frames.

9. A method, comprising:
extracting first features for a first person identified from a first frame;
extracting second features for a second person identified from a second frame;
continually updating the first and second features for the first and second persons in third frames as the first and second persons move around a physical environment;
determining in a fourth frame that the first person is obscuring the second person based on the first and second features and new features present in the fourth frame;
identifying some of the new features as being associated with the second person; and
tracking the first and second persons in fifth frames even when the first person is still obscuring the second person in at least some of those fifth frames.

10. The method of claim 9 further comprising, processing the method within a tracking system associated with a frictionless store.

11. The method of claim 9 further comprising, processing the method within a tracking system associated with inventory management and/or security management.

12. The method of claim 9 further comprising, processing at least a portion of the method as a machine learning algorithm that refines the processing dynamically in real-time as the first and second persons move within the physical environment.

13. The method of claim 9, wherein determining further includes identifying the first person obscuring the second person based on a last recorded location within the physical environment recorded for the second person in the third frames and a present location within the physical environment for the fourth frame.

14. The method of claim 13, wherein identifying further includes excluding the first features and known environment features for the physical environment from third features extracted for the fourth frame to identify potential features to associate with the new features.

15. The method of claim 14, wherein excluding further includes scoring and weighting the potential features and comparing the scored and weight potential features against thresholds for the second features to derive the new features.

16. The method of claim 9, wherein identifying further includes updating the second features based on the new features.

17. A system, comprising:
a server configured with an image tracker;
wherein the image tracker is configured to:
i) execute on at least one processor of the server,
ii) maintain unique image features that are continually refined for uniquely identifying a first person and a second person from image frames,
iii) identify select frames in which the first person is at least partially obscuring the second person,
iv) assign new tracking features identified from the select frames to the second person, and
v) track actions taken by the first person and the second person within a physical environment in all of the frames.

18. The system of claim 17, wherein the system is deployed within one or more of: a frictionless store, a secure area being monitored, and an area where inventory is being monitored and managed.

* * * * *